Aug. 18, 1964 G. H. WARFEL ETAL 3,144,989

TAPE FEED-OUT DISABLING MEANS

Filed Jan. 31, 1963

INVENTORS.
GEORGE H. WARFEL
ALBIN W. THORSON

BY

Boyken, Mohler + Foster

ATTORNEYS

United States Patent Office 3,144,989

Patented Aug. 18, 1964

3,144,989

TAPE FEED-OUT DISABLING MEANS

George H. Warfel, Menlo Park, and Albin W. Thorson, San Carlos, Calif., assignors to Bank of America National Trust and Savings Association, San Francisco, Calif., an American association Filed Jan. 31, 1963, Ser. No. 255,330
1 Claim. (Cl. 234—128)

Figure 1:
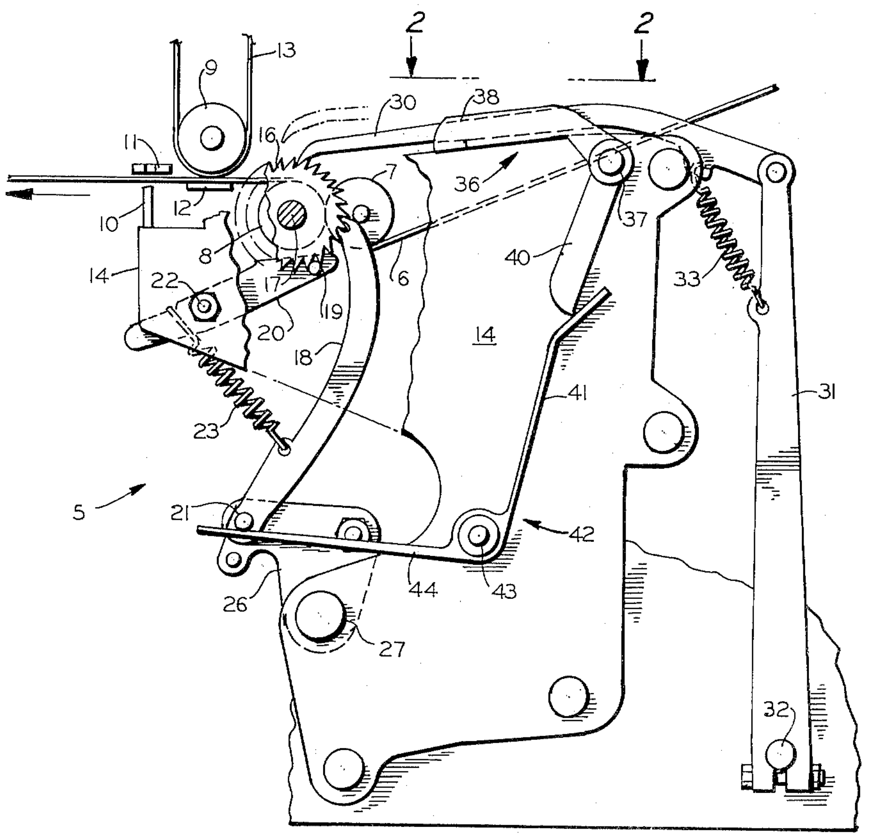

This invention relates to means for feeding tape past a recording device and more particularly to means for preventing feeding of tape past a recording device at a rate independent of the rate of recording while recording is taking place. The invention is illustrated in the description below as an improvement to a conventional typing reperforator in the telegraphy art.

Most devices for recording information on tape have feed means for feeding tape past a recording device at a rate dependent upon the recording rate while recording is taking place and selectively actuatable feed-out means for feeding tape past said recording device at a faster rate, independent of the recording rate, while recording is not taking place. If information or messages being recorded come from a remote source, and the signal for selectively actuating the feed-out means comes from a second remote source, it is possible for both means to be actuated at the same time, causing garbling of the record of the information or messages. This invention contemplates prevention of interference between the feed means and feed-out means by disabling the latter while recording on said tape is actually taking place.

"Recording" is used in this application in its most general sense, and includes all methods for impressing or placing information on a tape. "Tape," appearing unmodified, is also used in its general sense as an elongated web of thin material.

This invention will be described in detail below in its application as an improvement to a conventional typing reperforator. A typing reperforator, in response to a message signal from a remote sending keyboard, reproduces the message on paper tape simultaneously in the forms of punched holes and typed characters as the tape is fed past the recording heads. The punched holes allow reading of the tape by mechanical devices. The typed characters are imprinted on the tape for convenient reading or checking of messages by persons.

For the convenience of persons or operators reading or checking the tape, a conventional typing reperforator includes tape feed-out means for feeding out a predetermined length of blank tape past the inactive recording heads in response to a feed-out signal actuated by the reperforator operator. Thus, if the operator's desk or work space is located several feet away from the typing reperforator, feeding out several feet of blank tape following the punching and imprinting of a message will allow the whole message to reach the operator's work space without breaking the tape.

The conventional typing reperforator will halt such feed-out automatically if a message is received while the predetermined length of blank tape is being fed out, and punch and imprint such message. However, if the operator inadvertently attempts to initiate feed-out while a message is being punched and imprinted by a conventional typing reperforator, the message may be garbled, and it is possible for jamming of the typing and punching mechanism to occur. If the operator is positioned so that he cannot conveniently see the typing reperforator, it is likely that he will occasionally attempt to initiate feed-out while a message is being punched out.

The present invention, as applied to the typing reperforator, contemplates the addition of a simple and reliable mechanical means for disabling the tape feed-out mechanism while a message is being received and recorded, thus obviating the possibility of jamming the typing reperforator or of garbling a message, when an operator is at a location remote from the reperforator.

Accordingly, an object of this invention is to provide reliable means for preventing tape feed-out while recording information on tape.

Another object of this invention is the provision of means to prevent inadvertent garbling of information being recorded on tape.

It is a further object of this invention to provide means directly responsive to operation of a recording device for disabling a tape feed-out means associated therewith and thereby prevent jamming or damaging of such recording device.

Figure 2:
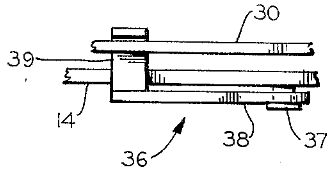

Other objects and advantages will become apparent from the following description and drawing in which:

FIG. 1 is a side elevational view of the perforator mechanism of a typing reperforator with the device of this invention incorporated therein; and FIG. 2 is a top plan view of a fragmentary portion of the device as seen from line 2—2 of FIG. 1.

FIG. 1 shows the perforator mechanism, generally designated 5, of a conventional typing reperforator. Mechanism 5 punches and types or imprints information on paper tape 6, feeding therethrough, in response to actuation by portions of the typing reperforator not shown, which, in turn, respond to signals from a remote sending keyboard. Paper tape 6 moves from a tape storage reel (not shown) located to the right of mechanism 5 as it is shown in FIG. 1 to a die wheel 7. As it passes between die wheel 7 and a feed wheel 8 adjacent thereto, tape 6 is engaged by teeth in the latter. Rotation of feed wheel 8 causes movement of tape 6. From feed wheel 8, tape 6 travels between a type wheel 9 and a typing plate 12, then between punches 10 and a die plate 11 and then outwardly of mechanism 5 in the direction shown by the arrow. A conventional inked ribbon 13 is positioned between type wheel 9 and paper tape 6.

In response to an appropriate signal from the remote sending keyboard, type wheel 9 and punches 10 simultaneously impress and punch a character upon paper tape 6. As said signal is received, type wheel 9 is rotated and positioned laterally (by mechanism which is not shown) such that the character corresponding to said signal is positioned directly over inked ribbon 13 and paper tape 6. Type wheel 9 then moves to press inked ribbon 13 and paper tape 6 against typing plate 12, thus impressing the character corresponding to said signal on paper tape 6. Simultaneously with movement of type wheel 9 towards typing plate 12, the combination of punches 10 corresponding to said signal is moved (by mechanism not shown) toward and through die plate 11, punching the combination of holes in paper tape 6 that corresponds to said signal. After type wheel 9 and punches 10 withdraw from engagement with paper tape 6, feed wheel 8 advances the tape by an amount equal to the length of said tape allotted to one character.

A side plate 14 provides support for many of the parts of mechanism 5. Side plate 14 is broken away in FIG. 1 to show die wheel 7 and feed wheel 8.

Feed wheel 8 is mounted on a common shaft 17 with a ratchet wheel 16 for rotation therewith. Ratchet wheel 16 is engaged by a feed pawl 18 and a detent pin 19 mounted on a detent lever 20. Feed pawl 18 pivots about a lock screw 21, while detent lever 20 pivots about a pivot point 22 secured to side plate 14. A tension spring 23 is mounted between detent lever 20 and feed pawl 18 and is positioned with respect to their pivots such that both detent pin 19 and feed pawl 18 are held in engagement with ratchet wheel 16.

Lock screw 21 is mounted to one corner of a generally triangularly shaped hinge 26. Another corner of hinge 26 is mounted to a shaft 27 for oscillation therewith. Shaft 27 is supported by side plate 14.

As type wheel 9 and punches 10 are moved to engage tape 6, shaft 27 is rotated counterclockwise through a few degrees from the position in which it is shown in FIG. 1. The counterclockwise rotation of shaft 27 moves hinge 26 and lock screw 21 through an arc in a direction generally away from ratchet wheel 16, causing feed pawl 18 to move sufficiently far to slip over a tooth on ratchet wheel 16. As type wheel 9 and punches 10 are moved away from engagement with tape 6, shaft 27 and hinge 26 are rotated clockwise back to their positions as shown in FIG. 1, causing feed pawl 18 to move the tooth over which it previously slipped and thus rotate ratchet wheel 16. Sufficient rotation of ratchet wheel 16 occurs to cause feed wheel 8 to advance paper tape 6 by the length of tape allotted to one character. The sequence of events from receiving a signal to advancing of tape 6 that has been described above comprises one complete punching cycle.

The feeding out of predetermined lengths of blank tape is accomplished through a second, feed-out pawl 30, which engages ratchet wheel 16. Feed-out pawl 30 is connected by a pivot at one end of a lever 31, generally perpendicular to said pawl. The other end of lever 31 is mounted on a shaft 32 for oscillation therewith. A tension spring 33 connected between feed-out pawl 30 and lever 31 forces pawl 30 into engagement with ratchet wheel 16.

When the operator signals for feed-out, shaft 32 is oscillated back and forth for a predetermined length of time. Oscillation of shaft 32 and lever 31 causes reciprocation of feed-out pawl 30. At each reciprocation, feed-out pawl 30 engages and moves a tooth of ratchet wheel 16, advancing tape 6. The rate at which blank tape is fed out ordinarily exceeds the rate at which a message is recorded, and is independent of the recording operation.

The conventional typing reperforator will halt feed-out at the beginning of each punching cycle; thus, feed out is halted by the receiving of a message. However, if the operator signals for feed-out while a message is being received, garbling of the message or jamming of mechanism 5 can occur. Specifically, if a feed-out signal is received after the beginning of a punching cycle, the conventional typing reperforator will attempt feed-out simultaneously with punching and typing until the beginning of the next punching cycle.

If feed-out and part of a punching cycle occur simultaneously, garbling of a character of the message is very likely to occur. If feed-out starts to occur during or before the portion of the punching cycle in which type wheel 9 and punches 10 engage paper tape 6, garbling will occur and it is likely that sufficient paper tape will pile up behind type wheel 9 or punches 10 for jamming of mechanism 5 to occur. Even though feed-out halts at the end of one punching cycle, once the tape has become stuck between type wheel 9 and typing plate 12, or between punches 10 and die plate 11, the feeding of paper tape that occurs while mechanism 5 attempts to punch and type the remainder of a message can cause enough tape to pile up to bring about serious and destructive jamming, requiring hours to clean and repair, no messages can be received.

To prevent the possibility of garbling a message or of jamming mechanism 5, this invention contemplates disabling the feed-out operation during those periods while characters are being recorded on tape 6. In its application to the typing reperforator, this invention includes a lifting lever 36 for lifting feed-out pawl 30 out of engagement with ratchet wheel 16. Lever 36 comprises two portions extending angularly from its pivot point 37, which is secured to side plate 14. The lifting arm 38 of lever 36 is adjacent and generally parallel to feed-out pawl 30. A tab 39 extends from the end of arm 38 towards and under feed-out pawl 30 (FIG. 2). The other arm 40 of lever 36 is at an angle to lifting arm 38 and directed generally towards hinge 26 and shaft 27.

Arm 40 of lifting lever 36 is engaged by an arm 41 of an actuating lever 42. Lever 42 is also angled about its pivot point 43, which is secured to side plate 14. The other arm 44 if lever 42 extends between shaft 27 and lock screw 21, and is engaged by a projecting portion of the latter.

When shaft 27 and hinge 26 rotate in a counterclockwise direction, the resulting motion of lock screw 21 moves arm 44 of actuating lever 42 generally downwardly. Arm 41 of actuating lever 42 thereby moves arm 40 of lifting lever 36 in a generally clockwise direction thus causing tab 39 of lifting arm 38 of lever 36, which engages feed out pawl 30, to lift the same out of engagement with ratchet wheel 16.

The tip of feed-out pawl 30 is shown in dotted line in FIG. 1 in the position it would occupy if lever 31 were in its most counterclockwise position while lifting arm 38 is in its lifted position. When hinge 26 and shaft 27 return to the position in which they are shown in FIG. 1, feed-out pawl 30 is released by lifting lever 36 and returned to engagement with ratchet wheel 16 by spring 33.

Since hinge 26 and shaft 27 rotate counterclockwise simultaneously with each engagement of tape 6 by type wheel 9 and punches 10, the reliable mechanical linkage of actuating lever 42 and lifting lever 36 lifts feed-out pawl 30 away from engagement with ratchet wheel 16 during each period that punching and typing are actually taking place. Since garbling of a message and jamming of mechanism 5 by feed-out can only result from feed-out during the period of engagement between type wheel 9 and punches 10 with paper tape 6, the lifting of feed-out pawl 30 from ratchet wheel 16 during such periods of engagement obviates the possibility of garbling or jamming.

Thus it will be seen that the invention herein described provides a simple and foolproof means for disabling the tape feed-out means during recording, such as imprinting or punching, on tape. With other forms of recording devices or feed-out means it may be desirable to utilize different specific means for disabling the latter. In any case, however, a feed-out disabling means which is directly responsive to operation of the recording means is believed to be the most effective protection against message garbling and jamming of the recording means.

While a single embodiment of this invention has been described, it will be apparent that the invention is capable of variation and modification from the form shown, and it is to be understood that the scope thereof should be limited only by the scope of the claim appended hereto.

We claim:

Apparatus for recording on tape comprising:

(*a*) an intermittently operable recording device for recording information on said tape;

(*b*) tape feed means connected to said recording device for moving a predetermined amount of said tape past said recording device after each operation of the same;

(*c*) selectively actuatable feed-out means for moving said tape past said recording device at a fixed rate independent of operation of said recording device;

(*d*) disabling means engageable with said feed-out means for disabling said feed-out means; and (*e*) means connecting said recording device with said disabling means for holding said disabling means in engagement with said feed-out means while said recording device is operating.

References Cited in the file of this patent

UNITED STATES PATENTS

| | | |
|---|---|---|
| 2,360,637 | Anspach et al. | Oct. 17, 1944 |
| 2,862,055 | Swan | Nov. 25, 1958 |
| 2,969,432 | Sim | Jan. 24, 1961 |